United States Patent
Ito

(10) Patent No.: US 6,983,262 B1
(45) Date of Patent: Jan. 3, 2006

(54) SERVER HAVING AN AUTOMATIC MANAGEMENT MECHANISM

(75) Inventor: Mitsuharu Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/511,351

(22) Filed: Feb. 23, 2000

(30) Foreign Application Priority Data

Jul. 22, 1999 (JP) .......................................... 11-207923

(51) Int. Cl.
*G06T 17/60* (2006.01)

(52) U.S. Cl. .............................. 705/59; 705/1; 705/57; 380/1; 713/200; 713/201; 713/202

(58) Field of Classification Search ................... 705/59, 705/57, 1; 713/200, 201, 202; 380/1
See application file for complete search history.

(56) References Cited

U.S. PATENT DOCUMENTS

| | | | | |
|---|---|---|---|---|
| 5,490,216 A | * | 2/1996 | Richardson, III | 705/56 |
| 5,754,763 A | * | 5/1998 | Bereiter | 705/59 |
| 5,790,664 A | * | 8/1998 | Coley et al. | 709/203 |
| 5,903,650 A | * | 5/1999 | Ross et al. | 705/59 |
| 5,905,860 A | * | 5/1999 | Olsen et al. | 705/59 |
| 5,991,876 A | * | 11/1999 | Johnson et al. | 705/54 |

FOREIGN PATENT DOCUMENTS

| | | |
|---|---|---|
| JP | 4-107628 | 4/1992 |
| JP | 11-31129 | 2/1999 |
| JP | 2002312051 | * 10/2002 |

OTHER PUBLICATIONS

Software license management with smart cards, Thomas Aura, Date unknown.*

* cited by examiner

Primary Examiner—James P. Trammell
Assistant Examiner—John M Winter
(74) Attorney, Agent, or Firm—Staas & Halsey LLP

(57) ABSTRACT

A server, having an automatic management mechanism, automatically delivers a request for license from a user to a communication window, automatically arranges information such as titles of software parts, keywords of the software parts, etc. in a hierarchical structure, performs a certification only when a user access a web page for which a certification is necessary, or automatically extracts, from a document such as a specification or a manual, an explanation of a software part to be registered, whereby the procedure for arranging images is automated, the process for certification is simplified so that the time necessary for the certification procedure is shortened, and the time necessary for a user to wait until the explanation becomes useable is shortened.

5 Claims, 14 Drawing Sheets

Fig.8

| ITEM | KEYWORD |
|---|---|
| FUNCTION | FUNCTION, ⋯ |
| SUPPORT MPU | PROCESSING UNIT, CPU, MPU, LSI, ⋯ |
| PLATFORM | PLATFORM, OS, WINDOWS, UNIX, ⋯ |
| DEVELOPING LANGUAGE | ASSEMBLY LANGUAGE, LANGUAGE, ASSEMBLE, C, C++, VB, JAVA, ⋯ |
| OPERATING ENVIRONMENT | OPERATION, ENVIRONMENT, CONFIRM, ⋯ |
| ⋯⋯⋯⋯ | ⋯⋯⋯⋯ |

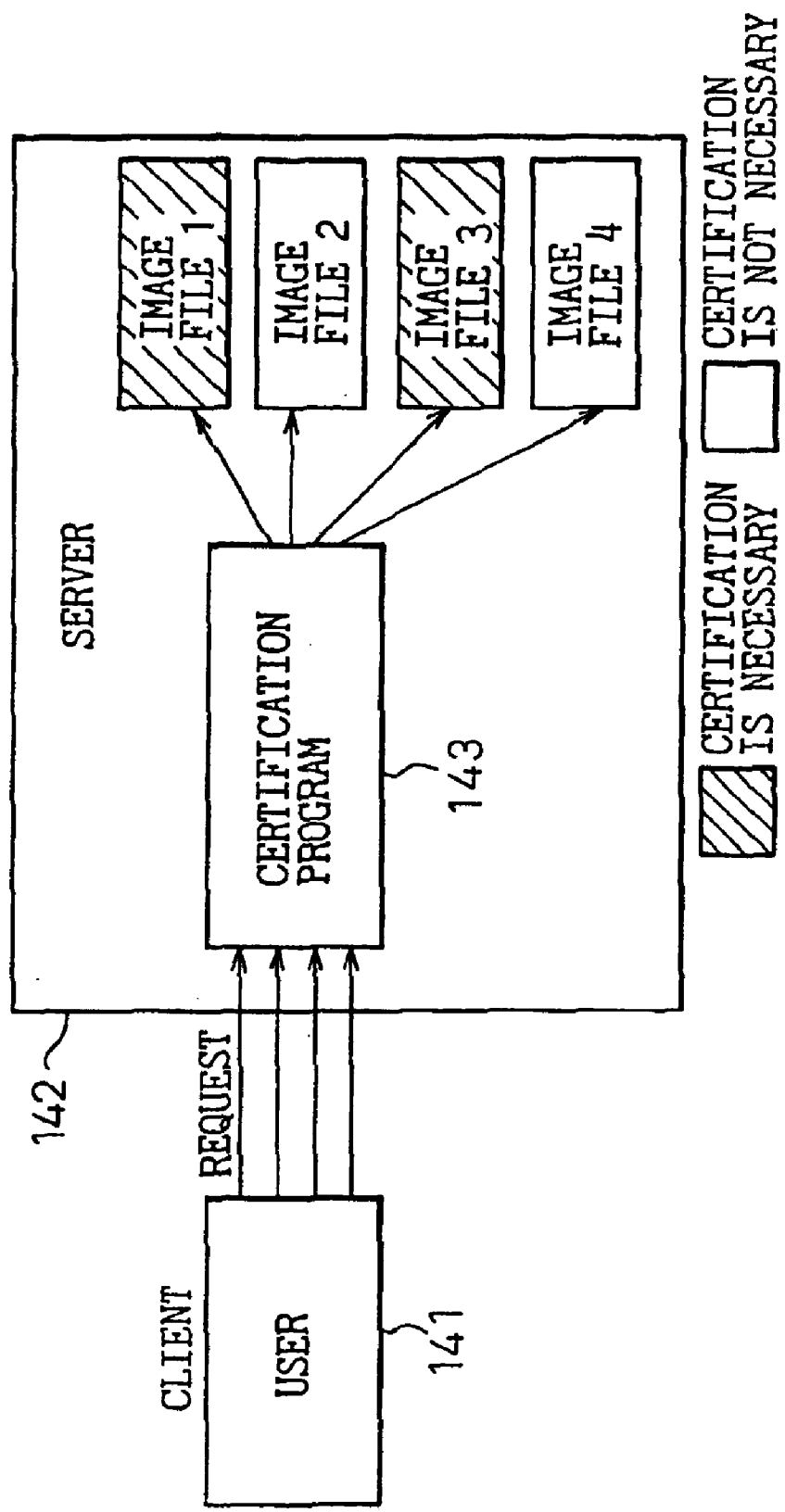

SERVER HAVING AN AUTOMATIC MANAGEMENT MECHANISM

BACKGROUND OF THE INVENTION

1. Field of the Invention

The present invention relates to a server having an automatic management mechanism. The automatic management mechanism, according to the present invention, automatically licenses a user to use software parts, such as software packages or software components, and has a function for automatically arranging images, a function to certify a user only when the certification is necessary, or a function to automatically extract explanations of software parts, when a user accesses the server through a web browser.

2. Description of the Related Art

FIG. 11 is a block diagram showing an outline of a software parts searching system for explaining the background of the present invention. In the figure, a reference numeral 111 denotes a web browser, and a reference numeral 112 denotes a web server. The web server 112 includes a processing unit 113 for executing a program for searching software parts, a program for registering software parts, a program for managing users, and a program for managing security, all of which are written in Hyper Text Markup Language (HTML) and/or Structured Query Language (SQL), a relational data base 114 and a buffer 115 for storing software parts. As to the software parts, there are device drivers such as a printer driver, a routine such as a rotation or edge extraction for image processing, or a source program, specification, description or the like for techniques, know-how or the like, all of which are stored in a library. The software parts searching system shown in FIG. 11 is so constructed that the software parts, which are stored in the library in order to efficiently store and distribute these software parts, can be easily provided to the users.

In the software parts searching system shown in FIG. 11, a licensing procedure, an image arrangement procedure, a user certification procedure, and an explanation extracting procedure, in the prior art, are briefly described in the following.

FIG. 12 is a block diagram showing a procedure of a conventional licensing process. Conventionally, when a user tries to download a software part from a web server 112, and when a license is necessary to obtain the software part, the process is as follows.

FIG. 12 is a block diagram showing a procedure of a conventional licensing process. Conventionally, when a user tries to download a software part from a web server 112, and when a license is necessary to obtain the software part, the process is as follows.

(1) A user 121 requests a system managing person 122, who manages the web server 112 through the web browser 111, to allow use of a software part by designating the title of the software part the user is going to use.

(2) The system managing person 122 requests a person at the communication window 123, representing the original developer of the designated software part, to allow the utilization of the particular software part.

(3) The person at the communication window 123 judges whether or not the allowance of the utilization of the software part is possible, and the judgment result is returned to the system managing person 122.

(4) The judgment result of whether or not the allowance of the utilization is possible is passed from the system managing person 122 to the user 121.

(5) If the utilization is allowed, the system managing person 122 releases the security of the software part to the user 121 who has requested utilization.

FIG. 13 is a diagram for explaining the conventional procedure to arrange titles of software parts on a displayed image file. In the figure, as the titles of new software parts, the DOCUMENT OCR 131 and the LAN DRIVER 132 are illustrated as examples. Each of the software parts is accompanied by a function a, a function b, a keyword a, and a keyword b. The software-parts searching program 133 manages files which are displayed on a display screen by means of the web browser. The files are managed hierarchically by means of items or titles of software parts classified according to various functions. In the illustrated example, software parts with titles of "IMAGE SIGNAL CONVERSION" and "PATTERN RECOGNITION" are arranged in the item "IMAGE"; and software parts entitled "MODEM" and "TCP/IP" are arranged in the item "COMMUNICATION". Conventionally, the arrangement of the software parts in the software-parts searching system was handled by a system managing person.

FIG. 14 is a diagram for explaining the general concept of a conventional user certification procedure. In the figure, conventionally, when a user 141 requests a server 142 to use either one of image files 1–4 which are software parts in the server 142, the server 142 carries out a user certification procedure by executing a certification program 143 for every request regardless of whether or not a certification is necessary for the request for utilization of an image file.

Further, although not shown in the figure, when a new software part is to be registered during an explanation extracting procedure, the explanation with respect to the software part such as a function, a supporting MPU, a platform, a development language for developing the software part, an operating environment, etc. must be registered simultaneously with the registration of the software part. Conventionally, the user, who is going to register a software part, extracts necessary expressions from a specification or a manual of the software part to be registered. Then the user brings the extracted expressions to the person at the communication window 123 (see FIG. 12), representing the origin of the development of the designated software part, to ask the person at the communication window 123 to prepare the explanation by converting the extracted expression into the text or HTML format. Thus, the explanation is prepared at the original developer.

According to the conventional licensing procedure, there are a number of steps to be carried out until the user can actually download the software part. As a result, there is a problem in that the load on the system managing person is large and that a response to the user is slow.

In addition, according to the conventional image arranging procedure, the system managing person has to consider where in the hierarchy the software part is to be arranged based on the information such as the title, the functions, the keyword, etc. of the software part. As a result, there is a problem in that the load on the system manager is large.

Further, according to the conventional user certification procedure, the certification procedure must be always effected even when the certification is not necessary. As a result, there is a problem in that the certification procedure takes a long time.

SUMMARY OF THE INVENTION

In view of the above problems in the prior art, an object of the present invention is to provide a server having an automatic management mechanism which can automatically carry out a licensing process and an image arranging process, to shorten the time necessary for a certification process, by simplifying the certification process when a software part is to be used, so as to shorten the time necessary for a user to be able to utilize an explanation.

To attain the above objects, there is provided, according to a first aspect of the present invention, a server having an automatic management mechanism for performing an automatic licensing process. The server comprises a processing unit for executing an automatic licensing program, and a buffer for storing identifications for identifying users, and for storing titles of software parts. The identifications and the titles of software parts are made to correspond to each other. The server further comprises a storing unit for storing the titles of the software parts and the names of license management origins each for providing an allowance to use one or more of the software parts. The titles of the software parts and the names of the license management origins are made to correspond to each other. The software parts storing unit gives security against free use of one of the software parts when an allowance by one of the license management origins is necessary upon a request to use the software part under consideration.

In such a server, when the processing unit receives a request for allowance to use a software part from a user, the processing unit executes the program to store the identification of the user in the buffer, extracts the license management origin corresponding to the software part, communicates with. i.e. interrogates, the license management origin as to whether or not the software part is useable, releases the security of the software part stored in the software parts storing unit only for the user who is allowed to use the software part, and informs the user whether or not the software part is useable. By the server according to the first aspect of the present invention, the licensing process can be automatically carried out so that the communication between a system managing person of the server and a person at the communication window, which was conventionally necessary, becomes unnecessary.

According to a second aspect of the present invention, there is provided a server having an automatic management mechanism for automatically arranging image files. The server comprises a processing unit for executing a program for automatically arranging titles of software parts in a hierarchical structure, and a display unit for displaying the titles of the software parts arranged in the hierarchical structure.

In such a server, when the processing unit receives a request for registration of a new software part from a user, the processing unit executes the program to display, on the display unit, elements other than the titles of the software parts arranged in the end layer of the hierarchical structure, counts a coincidence number between keywords input by the user and keywords included in the displayed elements, and arranges the title of the new software part in the layer immediately below the element having the keyword with the maximum count.

By the server according to the second aspect of the present invention, a new software part can be automatically arranged in an appropriate position in the hierarchical structure so that it is not necessary for a system managing person to arrange, by hand, a new software part in the software part searching system.

According to a third aspect of the present invention, there is provided a server having an automatic management mechanism for performing a user certification only when it is necessary. The server comprises a processing unit for executing a certification program, a file storing unit for storing a plurality of image files, a certification switching unit, a storing unit for storing user identifications, and a buffer for storing scripts indicating whether or not a certificate is necessary for each image file. In such a server, when the certification switching unit receives a request for accessing an image file from a user, the certification switching unit refers to the scripts to determine whether or not a certification is necessary to provide the required image file, and only when the certification is necessary, drives the processing unit to execute the certification program so as to provide the required image file to the user.

By the server according to the third aspect of the present invention, the certification program is executed only when a certification is necessary, so that the processes in the server can be simplified.

According to a fourth aspect of the present invention, there is provided a server having an automatic management mechanism for automatically preparing an explanation of a software part. The server comprises a table for storing items of explanations of the software part and keywords in the explanations. The items and the keywords are made to correspond. The server further comprises a processing unit for executing a program for automatically extracting explanations from a document, and a buffer for storing portions related to the keywords. In such a server, when the items and the keywords are specified, the processing unit extracts elements including the specified keywords corresponding to the specified items to store the extracted elements into the buffer. When all of the items and all of the keywords are specified, the extracted elements are determined as constituent elements of the explanation. The explanation is then reformed and is output to the buffer.

BRIEF DESCRIPTION OF THE DRAWINGS

The above objects and features of the present invention will be more apparent from the following description of the preferred embodiments when read in conjunction with the accompanying drawings, wherein:

FIG. 8 is a diagram showing an example of a part of an extracting keyword table in the server shown in FIG. 6;

FIG. 14 is a diagram generally showing a conventional user certification procedure.

DESCRIPTION OF THE PREFERRED EMBODIMENTS

In the following, preferred embodiments of the present invention will be described in detail with reference to the drawings.

Figure 1:
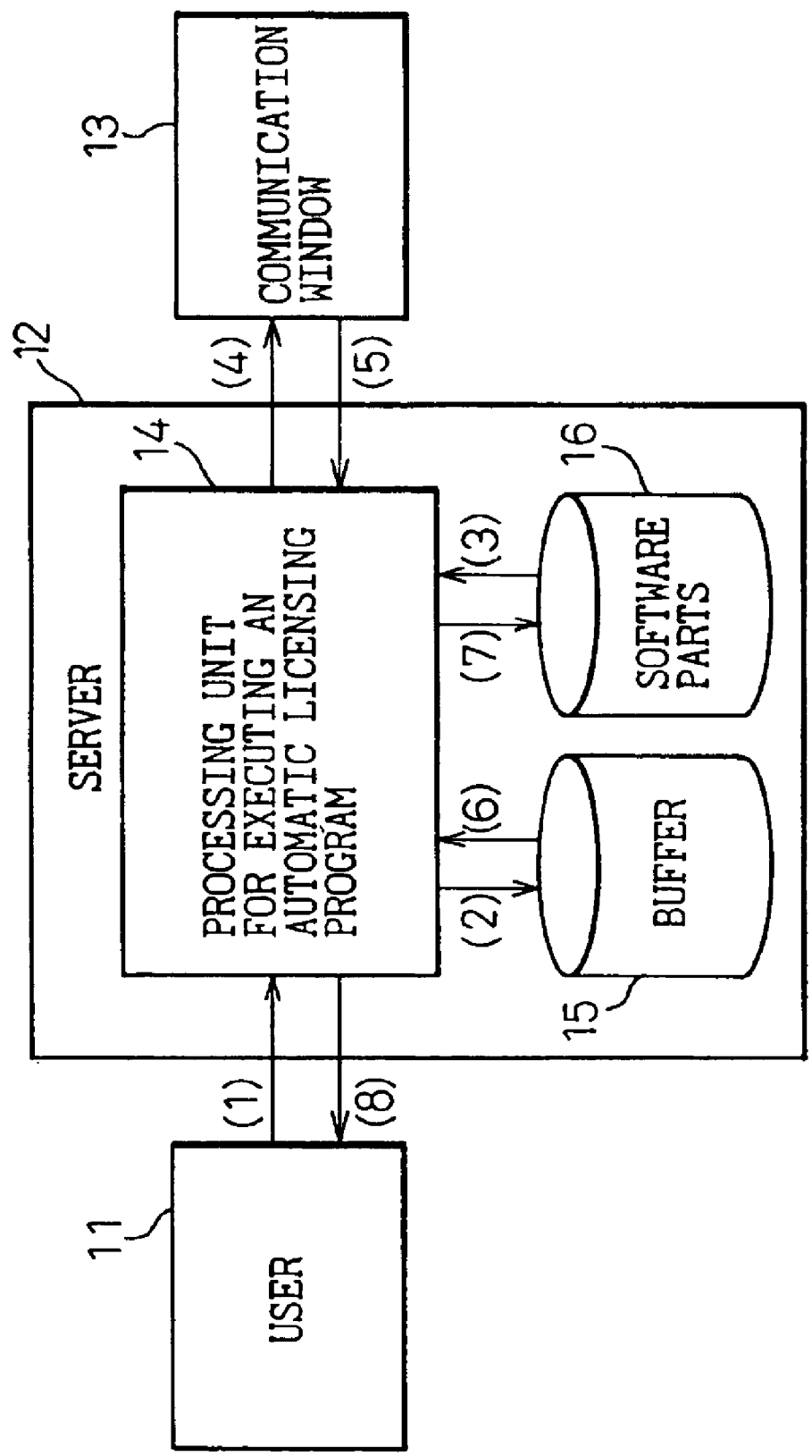
FIG. 1 is a block diagram showing a system including a server having an automatic management mechanism for performing an automatic licensing process, according to a first embodiment of the present invention.

FIG. 1 is a block diagram showing a system including a server having an automatic management mechanism for performing an automatic licensing procedure, according to a first embodiment of the present invention. In FIG. 1, reference numeral 11 denotes a user, 12 a server, and 13 a communication window. The server 12 includes processing unit 14, buffer 15, and storing unit 16. The processing unit 14 executes a program for automatically licensing to use a software part. The buffer 15 stores user identifications and titles of software parts corresponding to the user identifications. The storing unit 16 stores the titles of the software parts and the names of license management origins which allow use of the software parts. Any one or more of said software parts are provided with permission for use thereof, when an allowance by the corresponding one or more of said license management origins is necessary, upon receiving a request to use said one or more of said software parts. In the storing unit 16, the titles of the software parts and the names of the license management origins are made to correspond to each other.

Figure 2:
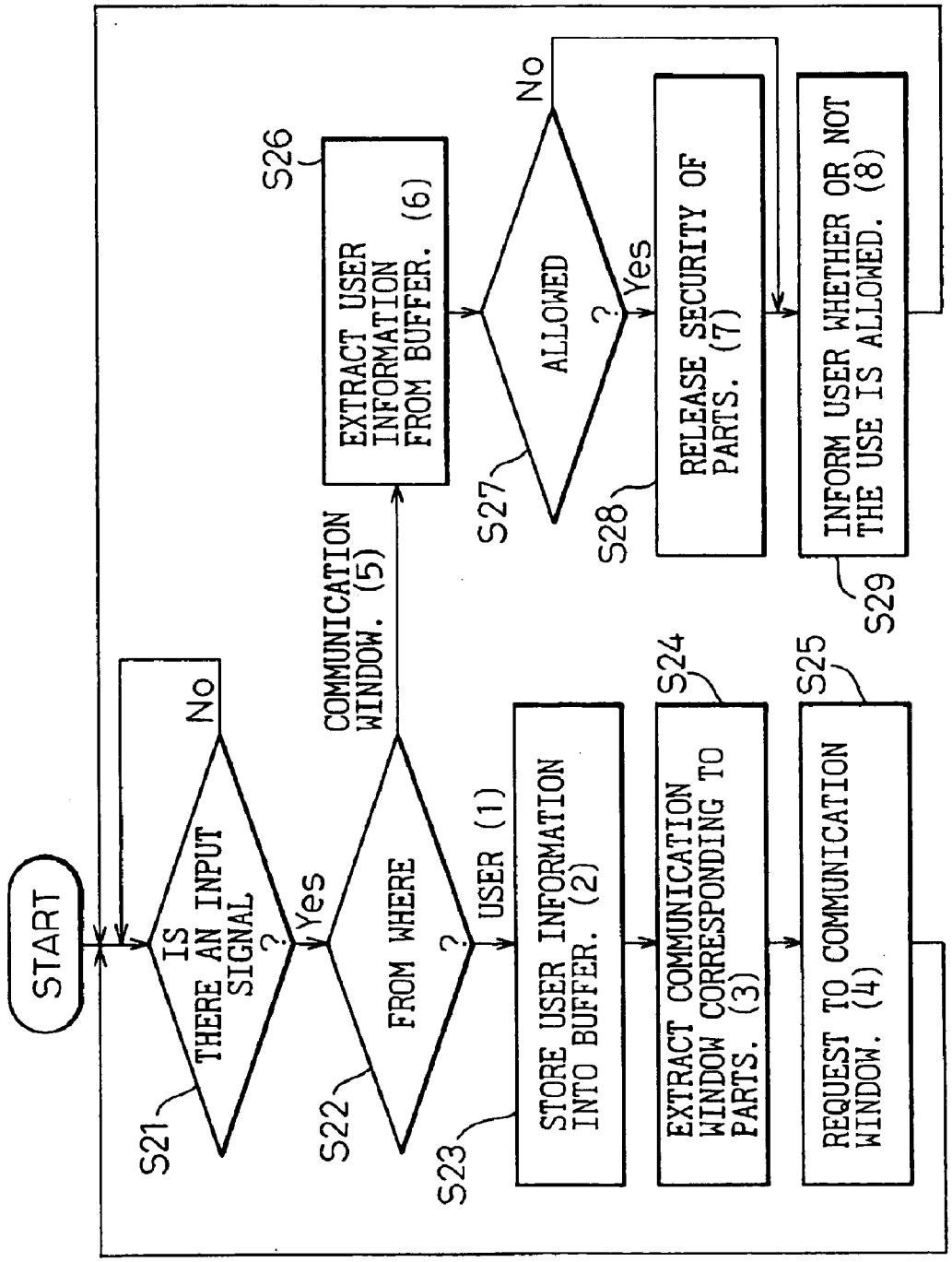
FIG. 2 is a flowchart for explaining the licensing procedure executed by the system shown in FIG. 1.

FIG. 2 is a flowchart for explaining the licensing sequence in the processing unit 14 in the server 12 shown in FIG. 1. In the figure, (1) to (8) represent procedures corresponding to the procedures (1) to (8) shown in FIG. 1.

In FIG. 2, at step S21, the processing unit 14 judges whether or not there is an input signal to the processing unit 14. When there is an input signal, the process proceeds to step S22 to determine the source of the input signal.

(1) When the input signal means a request, coming from a user through a web browser, for allowance to use a software part, the processing unit 14 accepts the request, and the process proceeds to step S23.

(2) At step S23, the processing unit 14 starts to execute the program for automatically licensing to use the software part, whereby the identification of the user is stored in the buffer 15. Then the process proceeds to step S24.

At step S24, according to the program, the processing unit 14 accesses a communicating (i.e., communication) window 13 which is the license management origin corresponding to the software part which is being requested for use. Then the process proceeds to step S25.

(4) At step S25, the processing unit 14 informs, to the communicating window 13 extracted at step S24, the identification of the user and the title of the software part requested for use so as to inquire whether or not the requested software part can be used. Then process returns to step S21 and the processing unit 14 supervises whether there is a further input signal.

(5) At step S22, when the input signal to the processing unit 14 is an answer from the communication window 13, the process proceeds to step S26. The answer includes the identification of the user and information of an allowance or prohibition to use the requested software part. The identification is made to correspond to the information of an allowance or prohibition. In the communication window 13, in order to cope with future version changes or trouble in each software part, the identifications of users and the names of software parts are made to correspond in pairs. Information as to the license including information on the charge, i.e., it is to be paid for or is free, is made to correspond to each of the pairs and is previously stored in the communication window 13.

(6) At step S26, the processing unit 14 extracts user information, corresponding to the user included in the answer from the communication window 13, from the buffer 15. Then the process proceeds to step S27.

(7) At step S27, the processing unit 14 judges whether or not the use of the software part requested by the user is allowed based on the answer from the communication window 13. If the use is allowed, the process proceeds to step S28. If the use is not allowed, the process proceeds to step S29.

(8) At step S28, the security for the software part corresponding to the title of the software part included in the answer from the communication window 13 is released to the user who is requesting use of the software part. Then the process proceeds to step S29.

At step S29, the processing unit 14 notifies the user who is requesting to use the software part whether or not the use of the software part is allowed. By the foregoing sequence, since the licensing procedure can be automatically executed, it has become unnecessary to communication between a system managing person, managing the server, and a person at the communication window. In the prior art, however, communication between the system manager and the communication window was necessary.

Figure 3:
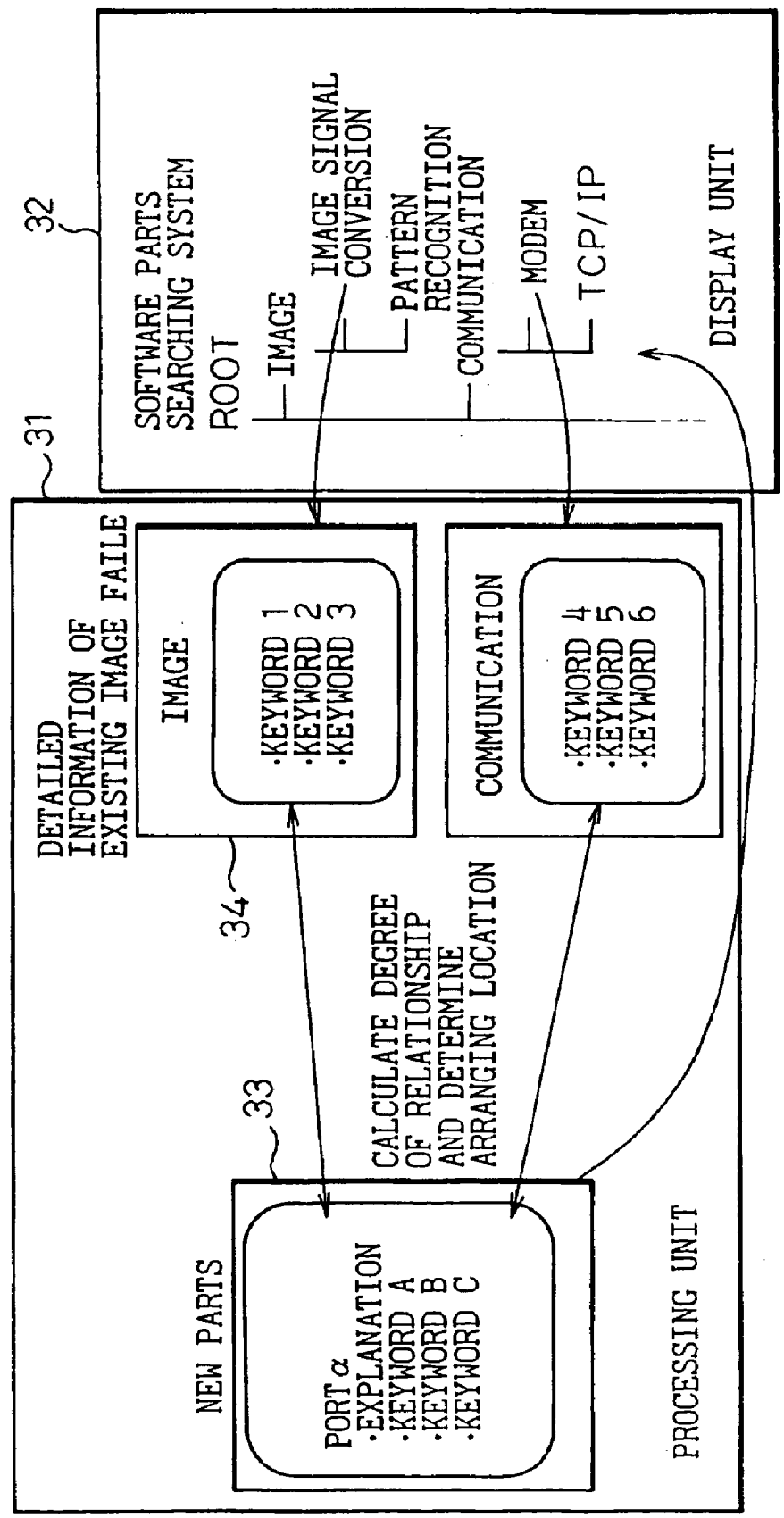
FIG. 3 is a block diagram showing a server having an automatic management mechanism for automatically arranging image files, according to a second embodiment of the present invention.

FIG. 3 is a block diagram showing a server having an automatic management mechanism for automatically arranging image files, according to a second embodiment of the present invention. According to this embodiment, the name of a new software part, the use of which is requested by a user, is automatically arranged in an appropriate position in a hierarchical structure of image files. In the figure, reference numeral 31 denotes a processing unit for executing a program for automatically arranging software parts by arranging the titles of the software parts in a hierarchical structure, and reference numeral 32 denotes a display unit for displaying the titles of the software parts arranged in the hierarchical structure. The processing unit 31 includes buffer 33 for new software parts and buffer 34 for detailed information. The buffer 33 stores a title a of a new software part when the new software part is requested to be registered by a user, an explanation with respect to the new software part, and keywords A, B, C, etc., in the explanation. The buffer 34 stores detailed information with respect to existing image files. In the buffer 34, keywords included in the explanation of existing software parts in the software part searching system in the server are made to correspond to the respective software parts and are stored.

Figure 4:
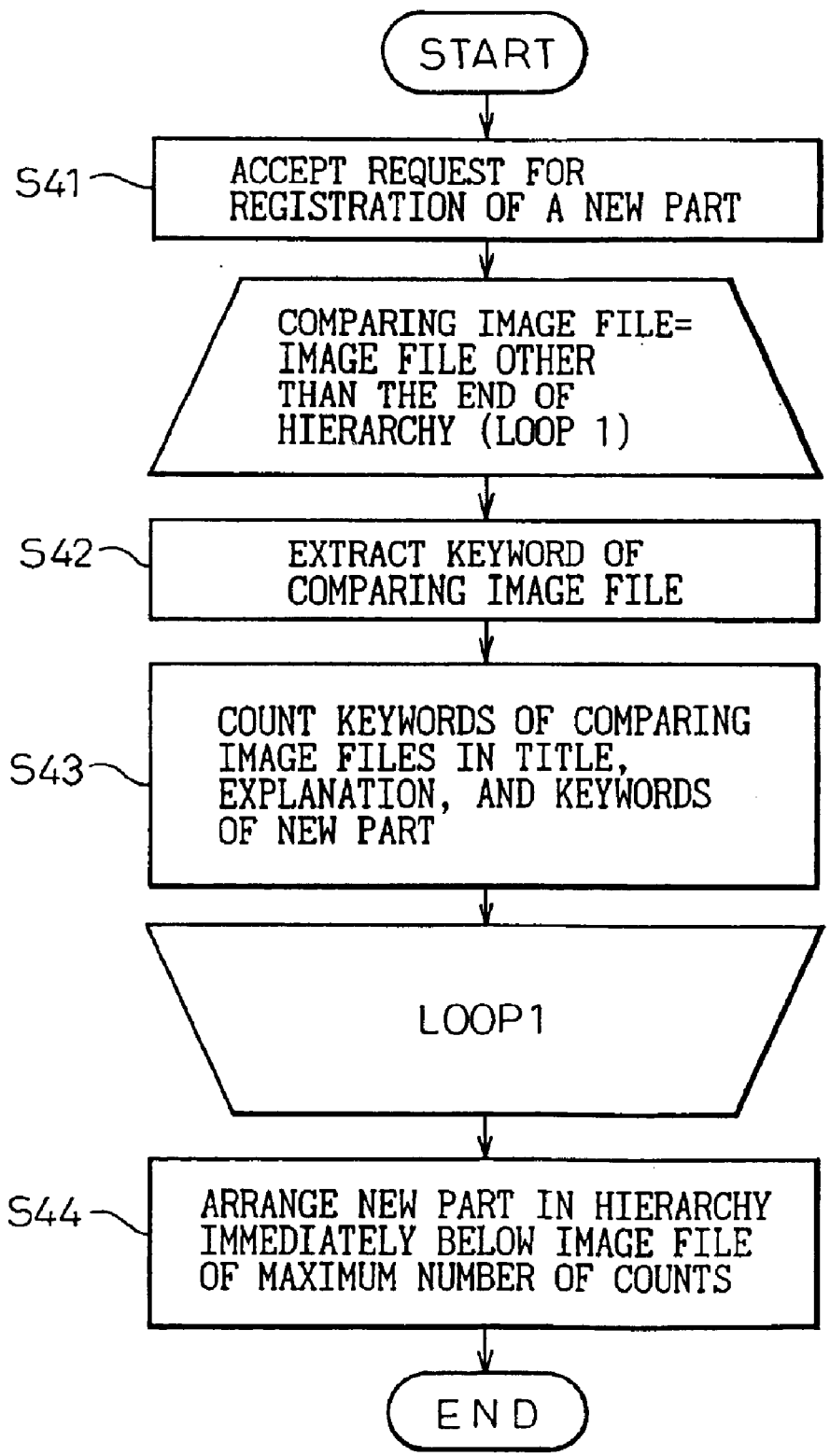
FIG. 4 is a flowchart for explaining a program for automatically arranging a title of a software part in the server shown in FIG. 3.

FIG. 4 is a flowchart for explaining a program for automatically arranging a title of a software part in the server shown in FIG. 3.

In FIG. 4, at step S41, a request for registration of a new software part from a user is accepted, and the title α of the software part, the explanation, and the keywords A, B, C, etc. are stored in the buffer 33 for the new software parts. Then, in steps S42 to S44, for each of the titles other than the titles of the software parts arranged at the end layer of the hierarchical structure in the software part searching system, the processing unit 31 calculates a degree of the relation between the new software part and the existing software parts. In the software part searching system shown in FIG. 3, the titles of the software parts arranged at the end layer are "IMAGE SIGNAL CONVERSION" and "PATTERN RECOGNITION" arranged at the end layer of the item "IMAGE" or are "MODEM" and "TCP/IP" arranged at the end layer of the item "COMMUNICATION". In FIG. 3 also, each of the titles other than the titles of the software parts arranged at the end layer of the hierarchical structure layer in the software part searching system is the item of "IMAGE" or "COMMUNICATION".

The keyword "IMAGE" of the comparing image file shown in FIG. 3 is extracted at step 542. At step S43, the number of coincidences of the title, the explanation, and the keywords of the new software part with the keyword of the comparing image file is counted. Then the process returns to step S42 to extract the keyword "COMMUNICATION" of the comparing image file, and at step S43, the number of coincidences of the title, the explanation, and the keywords of the new software part with the keyword of the comparing image file is counted.

When the processes in step S42 and step 543 are completed for all image files in the server, the process proceeds to step S44. At step S44, the processing unit 31 arranges the title of the new part in the layer immediately below the image file for which the number of matches is the maximum, and then the process for arranging the title of the software part is finished.

According to the above described second embodiment, the manual work to arrange the title of the new software part in the software part searching system by the system manager of the server can be eliminated.

Figure 5:
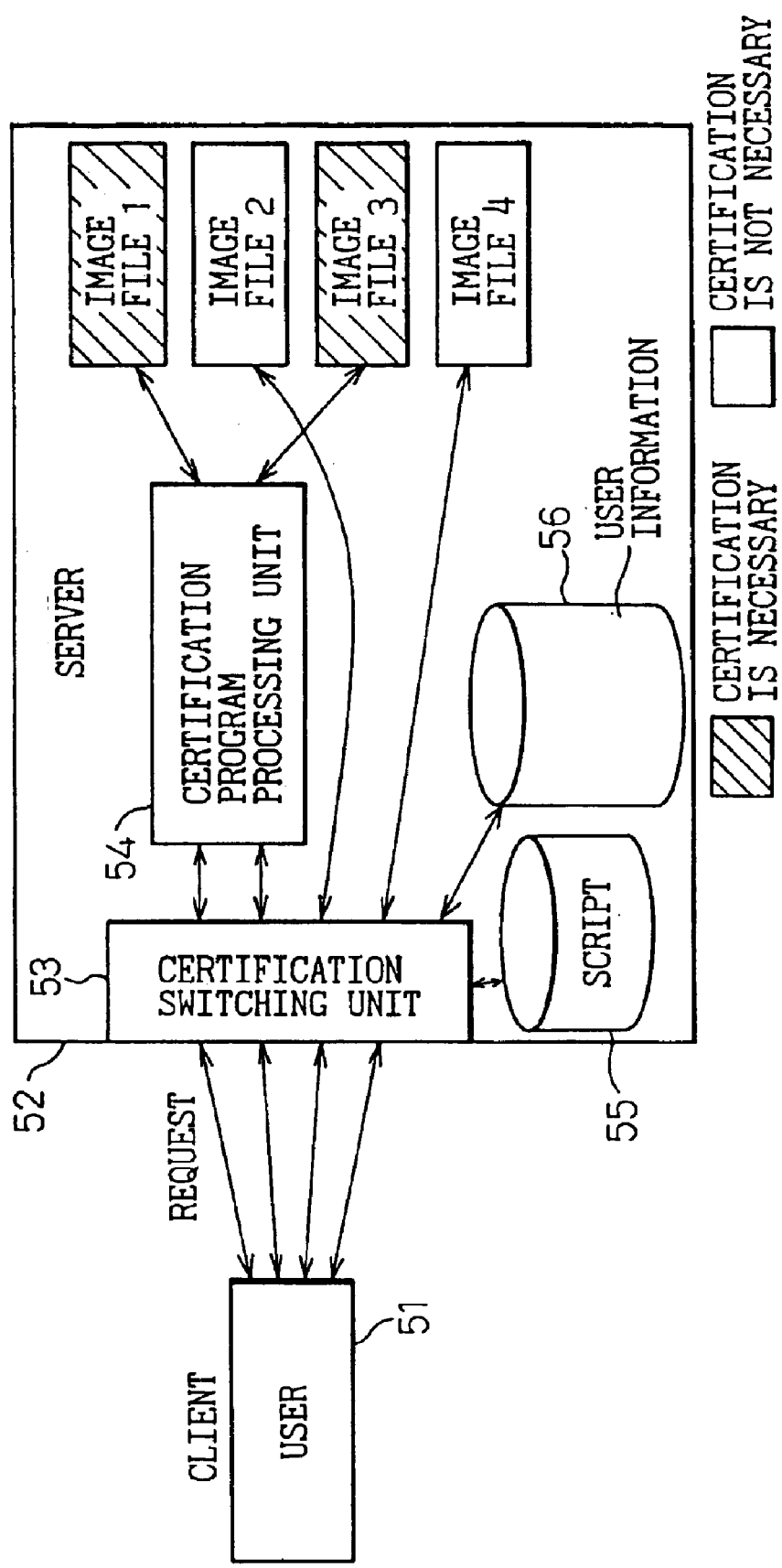
FIG. 5 is a block diagram showing a server having an automatic management mechanism for performing a user certification switching process, according to a third embodiment of the present invention.

FIG. 5 is a block diagram showing a server having an automatic management mechanism for performing a user certification switching process, according to a third embodiment of the present invention. In the figure, reference numeral 51 denotes a user and 52 a server. The server 52 includes certification switching unit 53, processing unit 54 for executing a certification program, script buffer 55 for storing information indicating whether or not a certification is necessary to use image file, and user information buffer 56 for storing information indicating whether or not a certification is necessary for each user identification.

Figure 6:
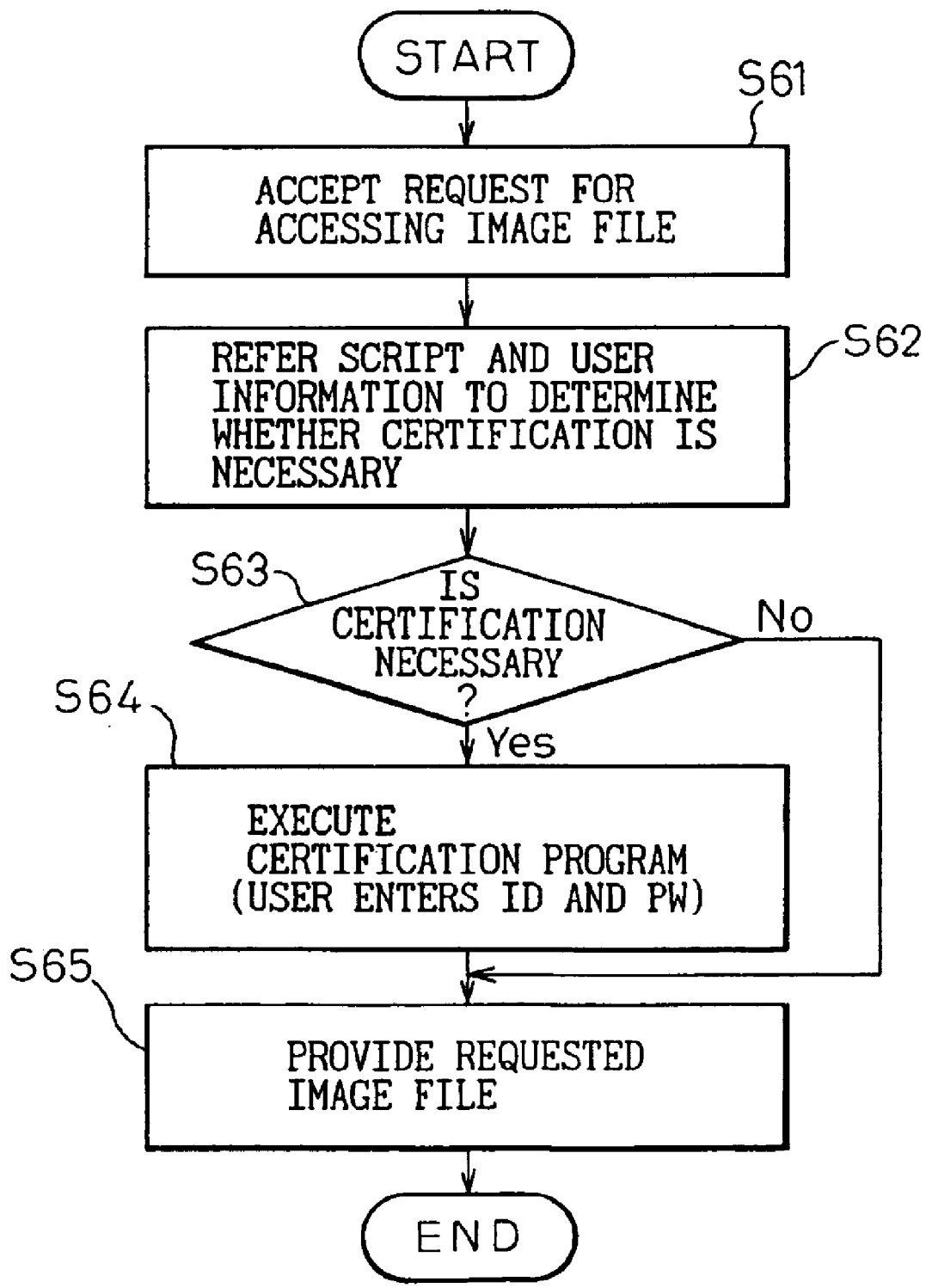
FIG. 6 is a flowchart for explaining the operation of a certification switching unit in the server shown in FIG. 5.

FIG. 6 is a flowchart for explaining the operation of the certification switching unit 53 in the server shown in FIG. 5. In the figure, at step S61, a request for accessing an image file, that is, a request for using a software part is accepted. Then at step S62, the script buffer 55 is referenced to determine whether or not certification is necessary to use the requested image file, and the user information buffer 56 is referred to to determine whether certification is necessary for the user 51. At step S63, when it is determined that a certification is necessary for at least one of the image files and the user, then at step S64 the certification program is executed. At this time, the user 51 is prompted by the server 52 to enter the user identification ID and a password PW. When both of the ID and PW respectively coincide with those stored in the user information buffer 56, the requested image file 1 or 3 for which the certification is necessary as indicated by slash lines in the figure is provided to the user 51. At step S63, when it is determined that the certification is not necessary, step S64 is skipped and at step S65, the requested image file 2 or 4 for which the certification is not necessary is provided to the user 51.

According to the above described third embodiment, when an image file for which a certification is not necessary is accessed, the image file is directly downloaded to the user without executing the certification program. Therefore, it is not necessary to execute the certification program for all of the requested image files so that the process in the server is simplified.

Figure 7:
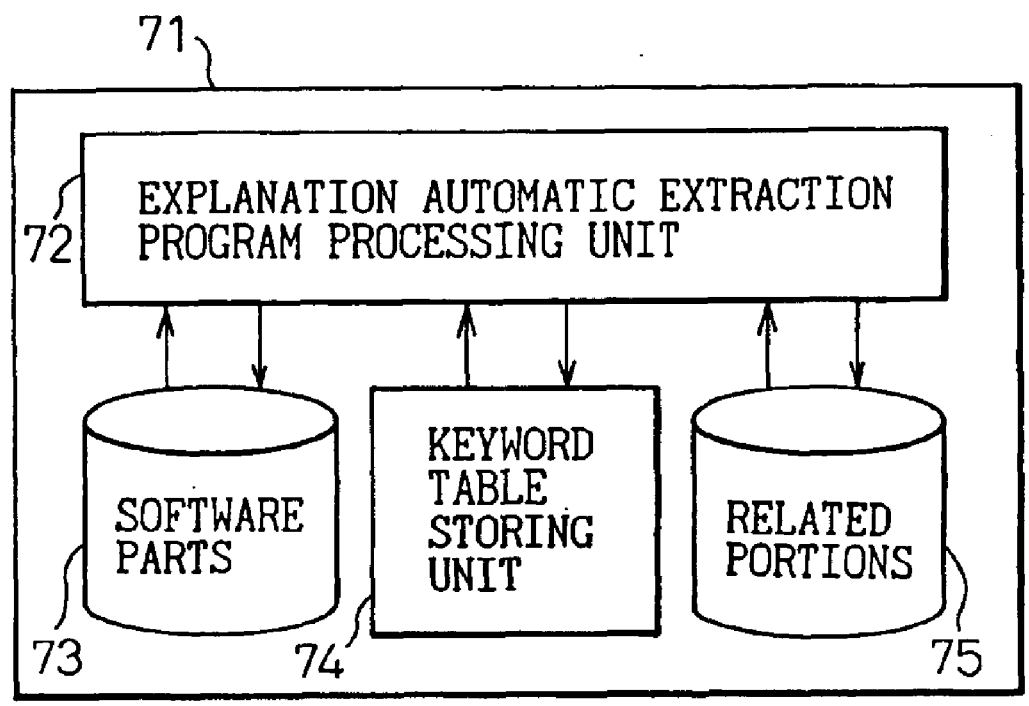
FIG. 7 is a block diagram showing a server having an automatic management mechanism for automatically extracting explanations, according to a fourth embodiment of the present invention.

FIG. 7 is a block diagram showing a server having an automatic management mechanism for automatically extracting an explanation, according to a fourth embodiment of the present invention. In the figure, reference numeral 71 denotes a server, 72 a processing unit for executing a program for automatically extracting an explanation, 73 a buffer for storing information relating to software parts, 74 a storing unit for storing a table of extracting keywords, and 75 a buffer for storing related portions. The buffer 73 stores a title of a software part, the outline of the software part, an explanation of the software part, a communicating window, related portions, etc. for each software part.

According to this embodiment, the server automatically extracts an explanation of a software part from a document such as a specification of the software part. FIG. 8 is a diagram showing an example of a part of a table of extracting keywords in the server shown in FIG. 6. As shown in the figure, in the table of the extracting keywords, various keywords are provided for each of items "FUNCTION", "SUPPORT MPU", "PLATFORM", "DEVELOPING LANGUAGE, "OPRATING ENVIRONMENT", etc.

Figure 9:
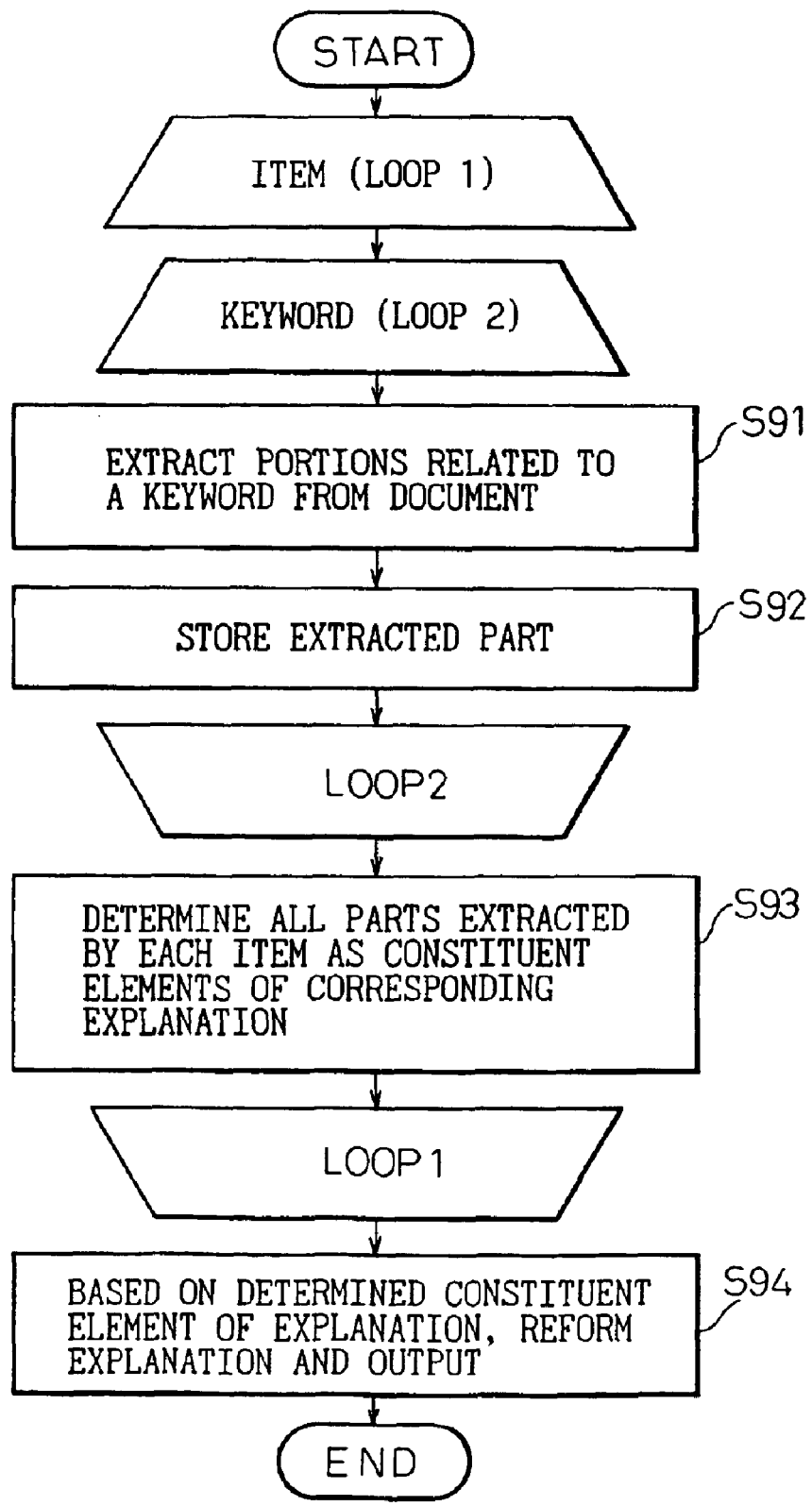
FIG. 9 is a flowchart for explaining a program for automatically extracting an explanation executed by the server shown in FIG. 7.

FIG. 9 is a flowchart for explaining a program for automatically extracting an explanation executed by the server shown in FIG. 7. In the figure, at step S91, portions relating to a single keyword corresponding to a single item are extracted from a specification of the software part under consideration. For example, as the portion relating to the keyword "FUNCTION" corresponding to the item "FUNCTION", a paragraph including the word "FUNCTION" is extracted from the explanation. Then at step S92, the extracted related portion is stored in the buffer 75. The steps S91 and S92 are repeated for all of the keywords of the item (Loop 2).

When the process for all of the items is finished, the process proceeds to step S94 to reform or shape the explanation based on the constituent elements of the explanation, and the reformed explanation is output to the buffer 73.

Figure 10:
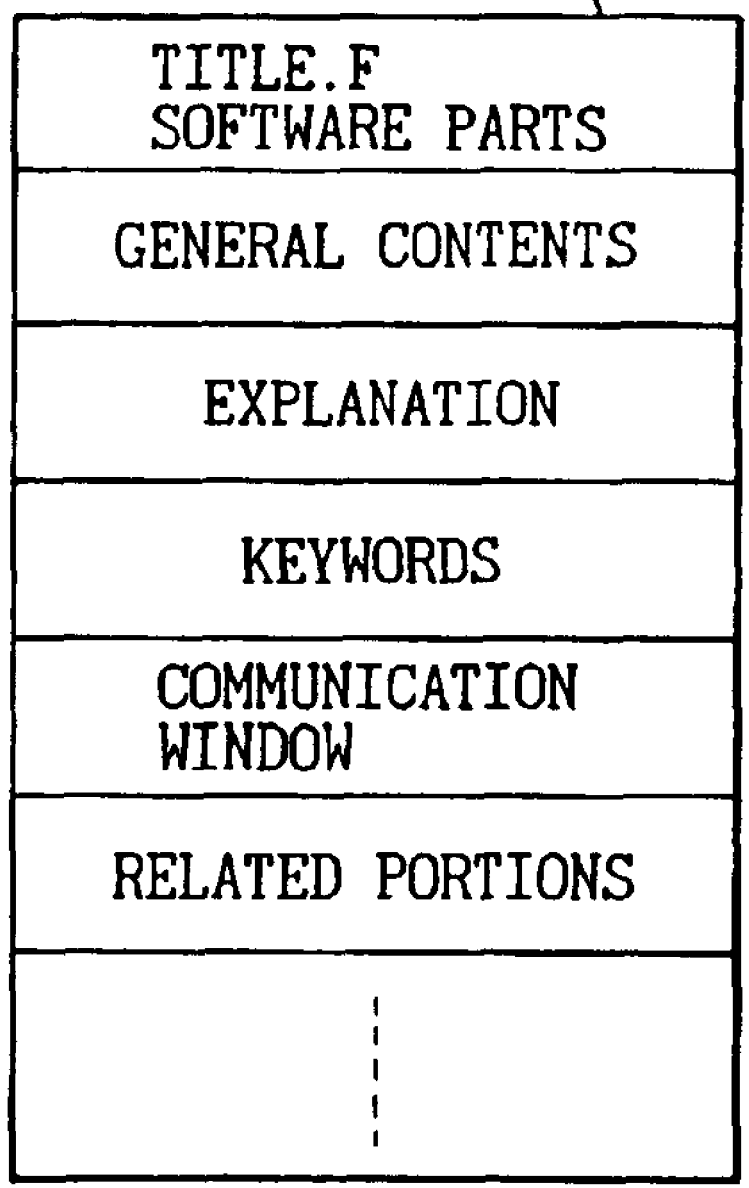
FIG. 10 is a diagram showing an example of a buffer in the system shown in FIG. 7 for storing information relating to software parts.
Figure 11:
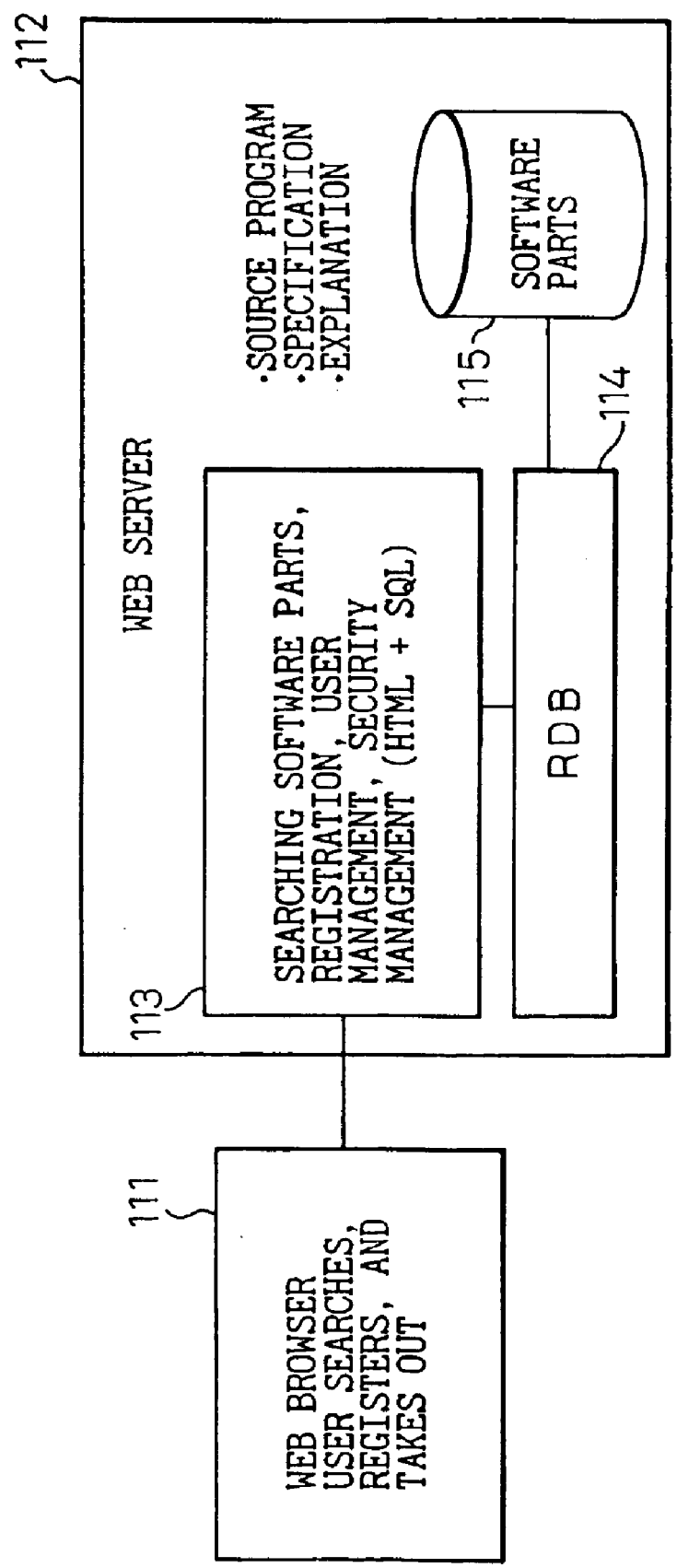
FIG. 11 is a block diagram generally showing software parts searching system explaining the background of the present invention.
Figure 12:
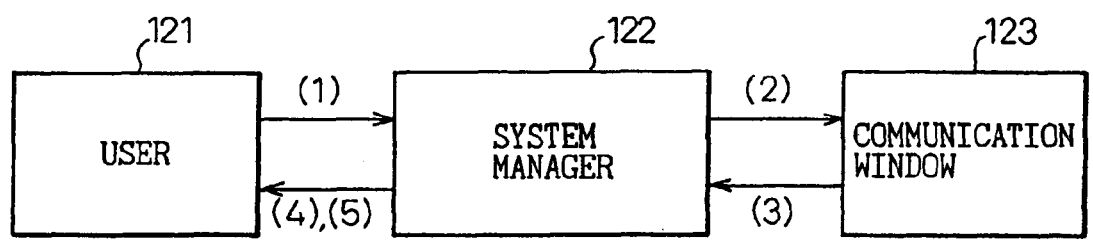
FIG. 12 is a block diagram showing a conventional licensing procedure.
Figure 13:
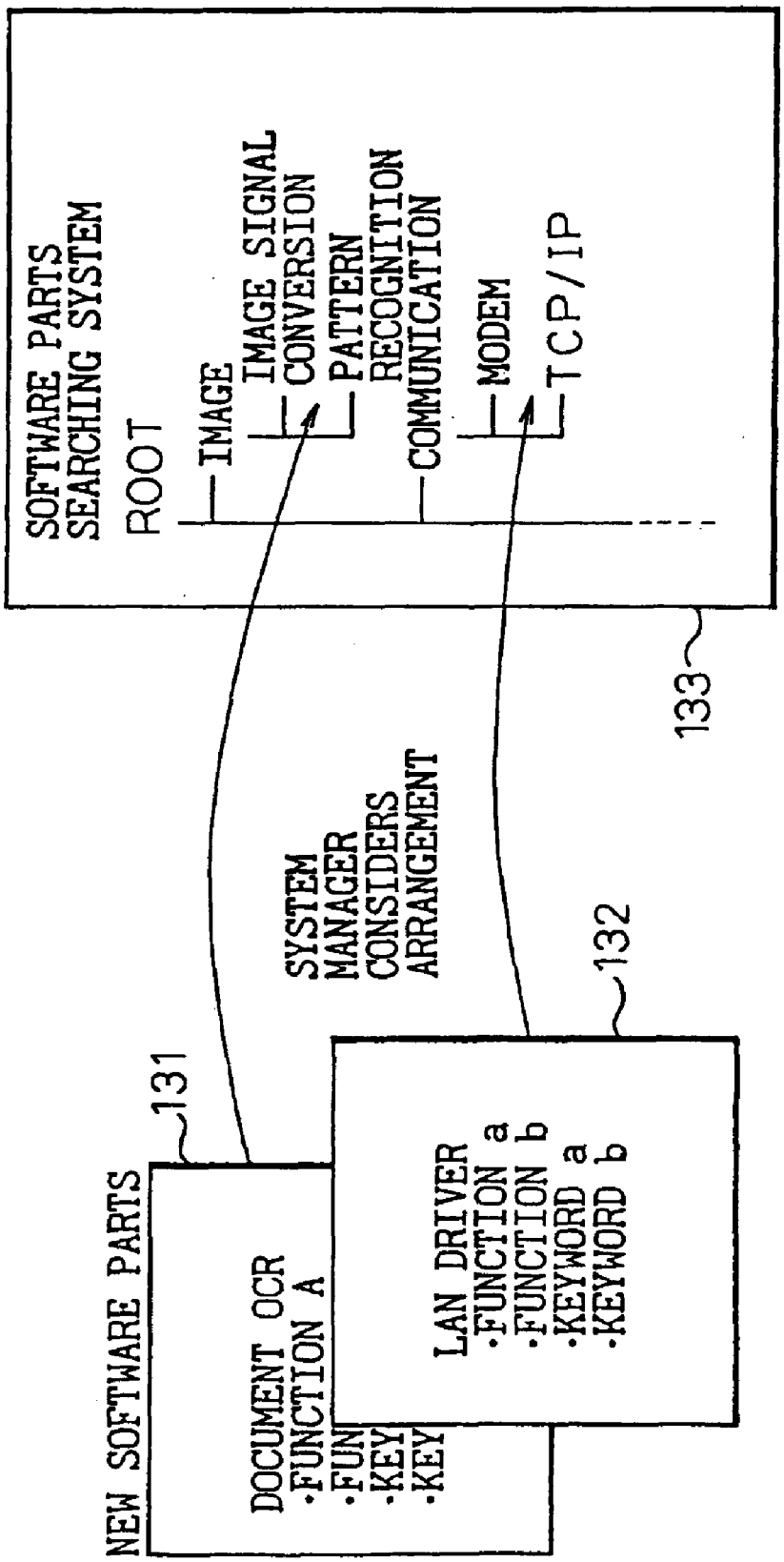
FIG. 13 is a diagram showing a conventional image arranging procedure.

FIG. 10 is a diagram showing an example of the buffer 73. As shown in the figure, the buffer 73 stores a title of a software part, the outline of the software part, an explanation, keywords, a communicating window, related portions, etc. for each software part. The explanation is automatically prepared and is stored in the buffer 73 according to this embodiment.

In the prior art, the explanation of the software part was prepared by the original developer. In contrast, according to the fourth embodiment of the present invention, since the server can automatically prepare the explanation, it has become unnecessary for a user to wait until the original developer prepares the explanation. Therefore, the software part can be used even when the explanation is not received from the original developer so that the software part can be used sooner.

From the foregoing description, it is apparent that, according to the present invention, a server having an automatic management mechanism can be provided. In the server according to the present invention, the licensing procedure and the procedure for arranging an image file can be automated. In addition, in the server according to the present invention, the certification procedure, when the software part is to be used, can be simplified so that the time required for the certification procedure is shortened and the time required for a user to be able to use an explanation can be shortened.

What is claimed is:

1. A server having an automatic management mechanism for performing an automatic licensing process to license use of, and for providing access to, one or more software parts comprising computer executable code developed by one or more corresponding license management origins, for use by a user requesting access to and use thereof, comprising:

a processing unit executing a program for automatically licensing to use said software parts;

a buffer storing pairs of identifications identifying respective users and titles of software parts respectively corresponding to said identifications;

a software parts storing unit storing said software parts, the titles of the software parts and names of said license management origins respectively corresponding to said software parts;

said license management origins providing an allowance to use one or more of said software parts when use of the one or more software parts is permitted and not providing allowance to use one or more of said software parts when use of the one or more software parts is not permitted, upon receiving a request to use said one or more of said software parts; and said processing unit comprising means, responsive to receipt of a request for allowance to use said one or more of said software parts from a user, for executing said program to store said respective identification of said user in said buffer, for extracting, from said software parts storing unit, said one or more of the license management origins corresponding to said one or more of said software parts, for interrogating said extracted one or more of said license management origins to obtain an answer as to whether or not said one or more of said software parts is allowed to be used, for providing access to, and allowing the use of, said one or more of said software parts stored in said software parts storing unit only for the identified user who is allowed to use the one or more software parts, and for informing the identified user whether or not the one or more software parts is/are useable thereby.

2. A server having an automatic management mechanism performing an automatic licensing process to license use of, and for providing access to one or more software parts comprising computer executable code developed by a one or more corresponding license management origins, for use by a user requesting access to and use thereof, comprising:

a processing unit executing a program for automatically licensing use of said software parts;

a buffer storing pairs of identifications identifying respective users and titles of software parts respectively corresponding to said identifications;

a software parts storing unit storing said software parts, the titles of the software parts and names of said license management origins respectively corresponding to said software parts;

said license management origins providing an allowance to use one or more of said software parts when use of the one or more software parts is permitted and not providing allowance to use one or more of said software parts when use of the one or more software parts is not permitted, upon receiving a request to use said one or more of said software part; and said processing unit, in response to receiving a request for allowance to use one or more of said software parts from a user, storing said identification of said user in said buffer, extracting, from said software part storing unit, said one or more of the license management origins corresponding to said one or more software parts, interrogating said extracted one or more of said license management origins to obtain an answer as to whether or not said one or more software parts is allowed to be used, providing access to and allowing use of the one or more software parts stored in said software parts storing unit only for the identified user who is allowed to use the software part, and informing the identified user whether or not the software part is useable thereby.

3. A method of performing an automatic licensing process to license use of and provide access to one or more software parts comprising computer executable code developed by one or more corresponding license management origins, for use by a user requesting access to and use thereof, by:

in response to a request for allowance to use one or more software parts from the user, storing pairs of identifications identifying respective users and titles of software parts;

accessing stored titles of the software parts and corresponding names of license management origins, providing an allowance to use a requested one or more of said software parts when use of the one or more software parts is permitted and not providing an allowance to use one or more of said software parts when use of the one or more software parts is not permitted, extracting, from said software part storing unit, said one or more of the license management origins corresponding to the one or more requested software parts, and interrogating said extracted one or more license management origins to obtain an answer as to whether or not said software parts is allowed to be used; and providing access to, and allowing use of, the one or more software parts stored in said software parts storing unit only for the identified user who is allowed to use the one or more software parts, and informing the identified user whether or not the one or more software parts is/are useable thereby.

4. A computer readable memory medium storing a program controlling a computer to perform an automatic licensing process to license use of, and provide access to, one or more software parts comprising computer executable code developed by one or more corresponding license management origins, for use by a user requesting access to and use thereof, by:

in response to a request for allowance to use one or more software parts from the user, storing pairs of identifications identifying respective users and titles of software parts;

accessing stored titles of the software parts and corresponding names of license management origins, providing an allowance to use a requested one or more of said software parts when use of the one or more software parts is permitted and not providing an allowance to use one or more of said software parts when use of the one or more software parts is not permitted, extracting, from said software part storing unit, said one or more of the license management origins corresponding to the one or more requested software parts, and interrogating said extracted one or more license management origins to obtain an answer as to whether or not said software parts is allowed to be used; and providing access to, and allowing use of, the one or more software parts stored in said software parts storing unit only for the identified user who is allowed to use the one or more software parts, and informing the identified user whether or not the one or more software parts is/are useable thereby.

5. A server having an automatic management mechanism for performing an automatic licensing process to license use of, and provide access to, one or more software parts comprising computer executable code developed by one or more corresponding license management origins, for use by a user requesting access to and use thereof, comprising:

a processing unit executing a program for automatically licensing to use said software parts;

a software parts storing unit storing software parts, pairs of identifications identifying respective users and titles of said software parts respectively corresponding to said identifications, the titles of the software parts, and names of said license management originals respectively corresponding to said software parts;

said license management origins providing access to and an allowance to use one or more of said software parts when use of the one or more software parts is permitted and not providing access to and an allowance to use one or more of said software parts when use of the one or more software parts is not permitted, upon receiving a request to use said one or more of said software parts; and said processing unit comprising means, responsive to receipt of a request for allowance to use said one or more of said software parts from a user, for executing said program to store said respective identification of said user in said buffer, for extracting, from said software part storing unit, said one or more of said software parts, for interrogating said extracted one or more of said license management origins to obtain an answer as to whether or not said one or more of said software parts is allowed to be used, for providing access to and allowing use of said one or more of said software parts stored in said software parts storing unit, only for the identified use who is allowed to use the software part, and for informing the identified user whether or not said one or more software parts is/are useable thereby.

* * * * *

UNITED STATES PATENT AND TRADEMARK OFFICE
CERTIFICATE OF CORRECTION

PATENT NO. : 6,983,262 B1
APPLICATION NO. : 09/511351
DATED : January 3, 2006
INVENTOR(S) : Mitsuharu Ito It is certified that error appears in the above-identified patent and that said Letters Patent is hereby corrected as shown below:

Column 9, Line 55, after "access to" insert -- , --.

Signed and Sealed this

Eighth Day of August, 2006

JON W. DUDAS
*Director of the United States Patent and Trademark Office*